United States Patent
Inoue

(10) Patent No.: US 11,784,814 B2
(45) Date of Patent: Oct. 10, 2023

(54) ARITHMETIC DEVICE AND METHOD

(71) Applicant: Kioxia Corporation, Tokyo (JP)

(72) Inventor: Kazuki Inoue, Kawasaki (JP)

(73) Assignee: Kioxia Corporation, Tokyo (JP)

( * ) Notice: Subject to any disclaimer, the term of this patent is extended or adjusted under 35 U.S.C. 154(b) by 140 days.

(21) Appl. No.: 17/199,940

(22) Filed: Mar. 12, 2021

(65) Prior Publication Data

US 2022/0078012 A1 Mar. 10, 2022

(30) Foreign Application Priority Data

Sep. 9, 2020 (JP) ................. 2020-151295

(51) Int. Cl.
| | |
|---|---|
| H04L 29/06 | (2006.01) |
| H04L 9/30 | (2006.01) |
| G06F 7/72 | (2006.01) |
| G06F 5/01 | (2006.01) |

(52) U.S. Cl.
CPC .............. *H04L 9/3066* (2013.01); *G06F 5/01* (2013.01); *G06F 7/725* (2013.01)

(58) Field of Classification Search
CPC .... H04L 9/3066; H04L 9/3093; H04L 9/3006
See application file for complete search history.

(56) References Cited

U.S. PATENT DOCUMENTS

| | | | | |
|---|---|---|---|---|
| 8,243,919 B2* | 8/2012 | Ebeid | ............. | G06F 7/725 380/28 |
| 9,400,636 B2* | 7/2016 | Meyer | ............. | H04L 9/3066 |
| 2007/0177721 A1* | 8/2007 | Itoh | ............. | G06F 7/723 380/28 |
| 2010/0040225 A1* | 2/2010 | Venelli | ............. | H04L 9/3066 380/28 |
| 2014/0016772 A1* | 1/2014 | Yajima | ............. | H04L 9/0816 380/28 |
| 2014/0064491 A1* | 3/2014 | Ghouti | ............. | H04L 9/08 380/282 |
| 2015/0339102 A1* | 11/2015 | Feix | ............. | H04L 9/3066 380/28 |
| 2017/0091148 A1* | 3/2017 | Takahashi | ............. | G06F 7/725 |
| 2018/0227115 A1* | 8/2018 | Ghosh | ............. | H04L 9/002 |

(Continued)

FOREIGN PATENT DOCUMENTS

JP 2017-67859 A 4/2017

*Primary Examiner* — Dao Q Ho
(74) *Attorney, Agent, or Firm* — Oblon, McClelland, Maier & Neustadt, L.L.P.

(57) ABSTRACT

According to an embodiment, the arithmetic device includes a controller. The controller is configured to: convert a bit string of m bits (where m is an integer of 4 or more) representing a multiplication value k when a certain condition is satisfied; set a value based on a coordinate value P of a specific point for a first variable and a second variable based on a second bit value from a least significant bit of the bit string; perform loop processing (m−3) times for multiplication processing of performing multiplication on the first variable and addition processing of adding two different points which are not infinite points by adding the first variable and the second variable; and output a coordinate value kP obtained by a scalar multiplication of the coordinate value P with the multiplication value k based on processing for a most significant bit of the bit string.

22 Claims, 9 Drawing Sheets

(56) References Cited

U.S. PATENT DOCUMENTS

2021/0226789 A1* 7/2021 Susella .................. H04L 9/002
2021/0306134 A1* 9/2021 Bocchi .................. G06F 7/768
2022/0078012 A1* 3/2022 Inoue .................. H04L 9/0643
2022/0191182 A1* 6/2022 Hamamoto ............. H04L 63/06

* cited by examiner

FIG.4 k=12  k=(1100)$_2$

| i | k'$_i$ | Q[0] | Q[1] |
|---|---|---|---|
| INITIAL VALUE | | - | - |
| 0 | 1 | - | - |
| 1 | 0 | P | 3P |
| 2 | 1 | 5P | 3P |
| 3 | 1 | 12P | 3P |

← LOOP PROCESSING

FIG.5

```
START
  ↓
S21: READ MESSAGE
  ↓
S22: GENERATE MESSAGE DIGEST
  ↓
S23: READ SECRET KEY, COEFFICIENT, AND COORDINATE POINT
  ↓
S24: GENERATE SIGNATURE
  ↓
S25: OUTPUT SIGNATURE
  ↓
END
```

PROCESSING 1. $Q[0]=O; Q[1]=P$;

PROCESSING 2. for $i=0$ to $m-1$
    PROCESSING 2-1. $b=k_i$;
    PROCESSING 2-2. $Q[1-b]=2Q[1-b]$;
    PROCESSING 2-3. $Q[1-b]=Q[b]+Q[1-b]$;

PROCESSING 3. $kP=Q[0]$;

FIG.11A else if($k_{m-1}$==1&&$k_0$==1)k'=n-k+1;

EXAMPLE) k=9  k=$(1001)_2$    n=13→13P=0 k'=n-k+1=13-9+1=5

| i | $k'_i$ | Q[0] | Q[1] |
|---|---|---|---|
| INITIAL VALUE |  | - | - |
| 0 | 1 | - | - |
| 1 | 0 | P | 3P |
| 2 | 1 | 5P | 3P |

← LOOP PROCESSING (PROCESSING AFTER LOOP FROM HERE)

|  |  | Q[0] | Q[1] |
|---|---|---|---|
|  |  | 5P | 4P |

| $k_{m-1}$ | $k_0$ | Q[0] | Q[1] |
|---|---|---|---|
| 1 | 1 | 4P | 4P |

FIG.11D kP=$k_{m-1}$==0?Q[0]:-Q[0];

| $k_{m-1}$ | $k_0$ | Q[0] | Q[1] |
|---|---|---|---|
| 1 | 1 | 9P (13-4)P | 4P |

ARITHMETIC DEVICE AND METHOD

CROSS-REFERENCE TO RELATED APPLICATIONS

This application is based upon and claims the benefit of priority from Japanese Patent Application No. 2020-151295, filed on Sep. 9, 2020; the entire contents of which are incorporated herein by reference.

FIELD

Embodiments described herein relate generally to an arithmetic device and a method.

BACKGROUND

Conventionally, there is scalar multiplication processing as a main operation of elliptic curve cryptography. In the scalar multiplication processing, a rational point is multiplied by a scalar value. In this scalar multiplication processing, loop processing is performed by the number of digits on a bit string of a scalar value, and addition processing is performed in the loop processing.

BRIEF DESCRIPTION OF THE DRAWINGS

FIG. 4 is a diagram illustrating changes in a variable Q[0] and a variable Q[1] when a multiplication value k is 12;

FIG. 5 is a flowchart illustrating a signature generation processing procedure according to the embodiment;

FIGS. 11A to 11D are diagrams illustrating changes in a variable Q[0] and a variable Q[1] when a multiplication value k is 9.

DETAILED DESCRIPTION

According to an embodiment, an arithmetic device includes a controller. The controller is configured to: convert a bit string of m bits (where m is an integer of 4 or more) representing a multiplication value k when a certain condition is satisfied; set a value based on a coordinate value P of a specific point for a first variable and a second variable based on a second bit value from a least significant bit of the bit string; perform loop processing (m−3) times for multiplication processing of performing multiplication on the first variable and addition processing of adding two different points which are not infinite points by adding the first variable and the second variable; and output a coordinate value kP obtained by a scalar multiplication of the coordinate value P with the multiplication value k based on processing for a most significant bit of the bit string.

The arithmetic device and the method according to the embodiment will be described in detail below with reference to the accompanying drawings. A device to which the arithmetic device according to the embodiment can be applied is not limited to the memory system. The arithmetic device according to the embodiment may be applied to any device including a memory that stores a computer program and a processor that executes the computer program. The memory system to which the arithmetic device according to the embodiment is applied will be described in detail below with reference to the accompanying drawings. The present invention is not limited to this embodiment.

Embodiment

Figure 1:
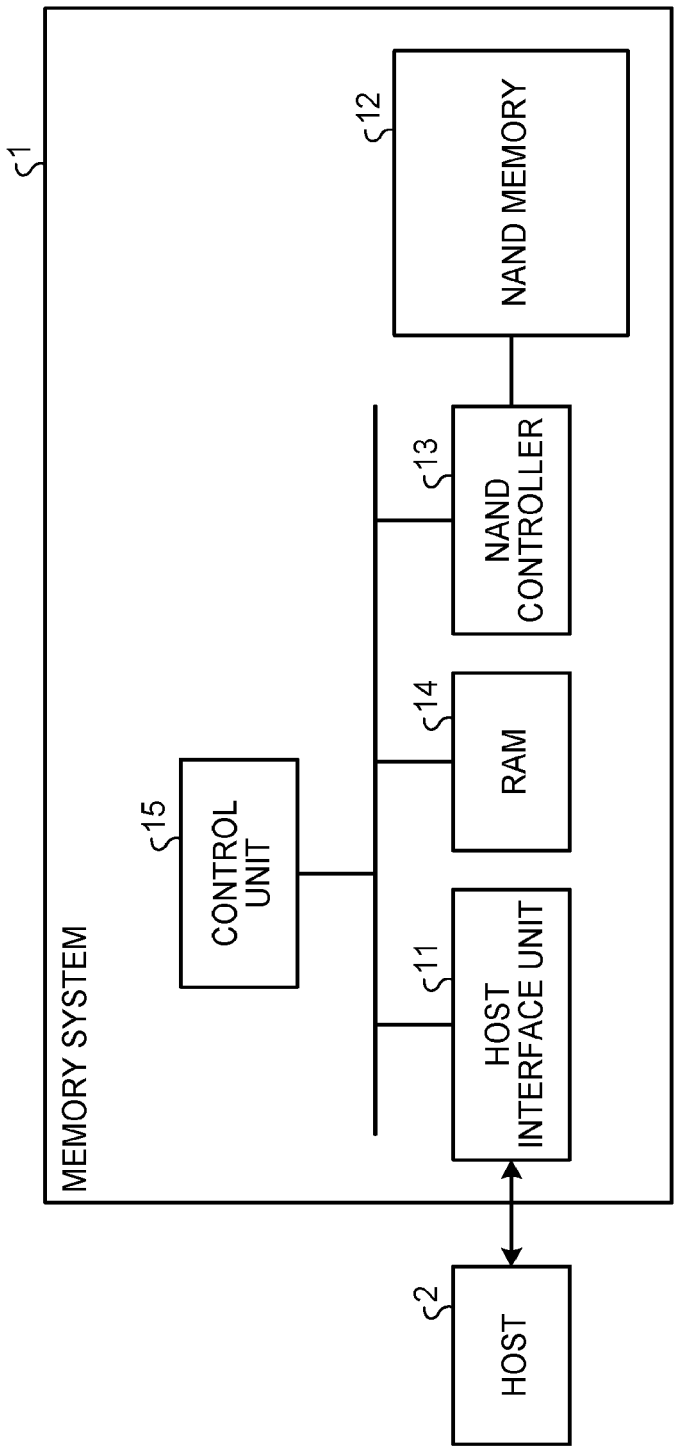
FIG. 1 is a diagram illustrating an example of a configuration of a memory system to which an arithmetic device according to an embodiment is applied.

FIG. 1 is a diagram illustrating an example of a configuration of a memory system 1 to which an arithmetic device according to the embodiment is applied. The memory system 1 is, for example, a solid state drive (SSD). In the following, a case in which a NAND type flash memory (hereinafter referred to as NAND memory) is used as a non-volatile memory will be described as an example.

The memory system 1 is configured to be capable of being connected to a host 2. For example, a central processing unit (CPU), a personal computer, a portable information device, a server, and the like correspond to the host 2. Any interface standard can be adopted as an interface standard for communication between the memory system 1 and the host 2. Two or more hosts 2 may be connected to the memory system 1 at the same time. The host 2 and the memory system 1 may be connected via a network.

The memory system 1 transmits and receives data to and from the host 2 according to an access command from the host 2.

The memory system 1 includes a host interface unit 11, a NAND memory 12, a NAND controller 13, a random access memory (RAM) 14, and a control unit 15.

For example, the control unit 15 includes one or more processors. The control unit 15 performs control of the memory system 1 by executing a program stored in a certain position in the memory system 1 in advance. A storage position of the program is arbitrarily designed. For example, the program is stored in the NAND memory 12 in advance, and loaded on the RAM 14 at startup. The control unit 15 executes the program loaded on the RAM 14. The control of the memory system 1 is configured of a plurality of processing. A part or all of a plurality of the processing performed by the control unit 15 may be implemented by a hardware circuit. The control unit 15 may be configured of a control circuit which is a hardware circuit. Each processing performed by the control unit 15 will be described later.

The host interface unit 11 is an interface device via which the memory system 1 communicates with the host 2. For example, the host interface unit 11 transmits user data between the host 2 and the RAM 14 under control of the control unit 15.

The NAND controller 13 is an interface device for accessing the NAND memory 12. The NAND controller 13 performs transmission of user data or management information between the RAM 14 and the NAND memory 12 under control of the control unit 15. Although the details are omitted, the NAND controller 13 can perform error correction processing.

The NAND memory 12 is a non-volatile storage medium that functions as a storage. The NAND memory 12 is configured of one or more chips.

The RAM 14 is a storage medium for temporarily storing data. As the RAM 14, for example, a type of storage medium faster than the NAND memory 12 can be adopted. As the RAM 14, for example, a volatile or non-volatile storage medium can be adopted. As the RAM 14, for example, a dynamic RAM (DRAM), a static RAM (SRAM), a ferroelectric RAM (FeRAM), a magnetoresistive RAM (MRAM), a phase change RAM (PRAM), and the like can be adopted.

Figure 2:
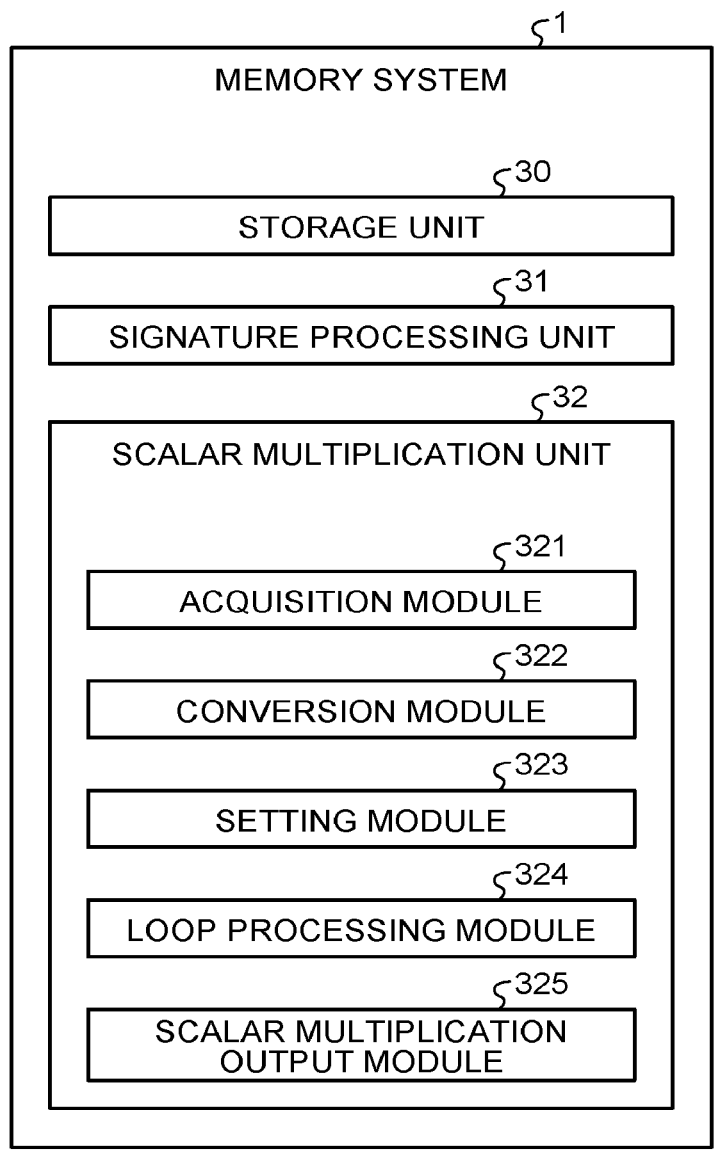
FIG. 2 is a block diagram illustrating an example of a functional configuration of a memory system 1 according to the embodiment.

FIG. 2 is a block diagram illustrating an example of a functional configuration of a memory system 1 according to the embodiment. As illustrated in FIG. 2, the memory system 1 includes a storage unit 30, a signature processing unit 31, and a scalar multiplication unit 32.

The storage unit 30 stores various information. The storage unit 30 stores, for example, a secret key, a public key, a curve coefficient, a coordinate value, a message, and signature information. The storage unit 30 is implemented by the RAM 14 and the NAND memory 12.

The signature processing unit 31 performs signature processing by using a random number value and the coordinate value. The signature processing unit 31 is implemented by the control unit 15. The signature processing unit 31 generates a random number, and inputs a multiplication value k, which is the random number value, and a coordinate value P of a specific point included in a specific elliptic curve to the scalar multiplication unit 32. The multiplication value k is represented by a bit string of m bits (where m is an integer of 4 or more). The signature processing unit 31 acquires a coordinate value kP from the scalar multiplication unit 32. The signature processing unit 31 generates a signature and verifies the signature by using the coordinate value kP.

The coordinate value P of the specific point may be indicated by any of an affine coordinate, a homogeneous coordinate (projective coordinate), and a Jacobian coordinate.

The scalar multiplication unit 32 calculates the coordinate value kP obtained by scalar multiplication of the coordinate value P of the specific point included in the specific elliptic curve with the multiplication value k. The scalar multiplication unit 32 is implemented by the control unit 15. The scalar multiplication unit 32 acquires the coordinate value P and the multiplication value k from the signature processing unit 31, and calculates the coordinate value kP by using these values.

The scalar multiplication unit 32 includes an acquisition module 321, a conversion module 322, a setting module 323, a loop processing module 324, and a scalar multiplication output module 325.

The acquisition module 321 acquires the coordinate value P and the multiplication value k from the signature processing unit 31. The conversion module 322 converts a bit string of the multiplication value k. The setting module 323 sets a value based on the coordinate value P for a variable based on the second bit from the least significant bit of the bit string of a multiplication value k'. The loop processing module 324 performs loop processing for multiplication processing and addition processing of the variable. The scalar multiplication output module 325 outputs the coordinate value kP based on the processing of the most significant bit of the bit string.

(Scalar Multiplication Processing Procedure)

Figure 3:
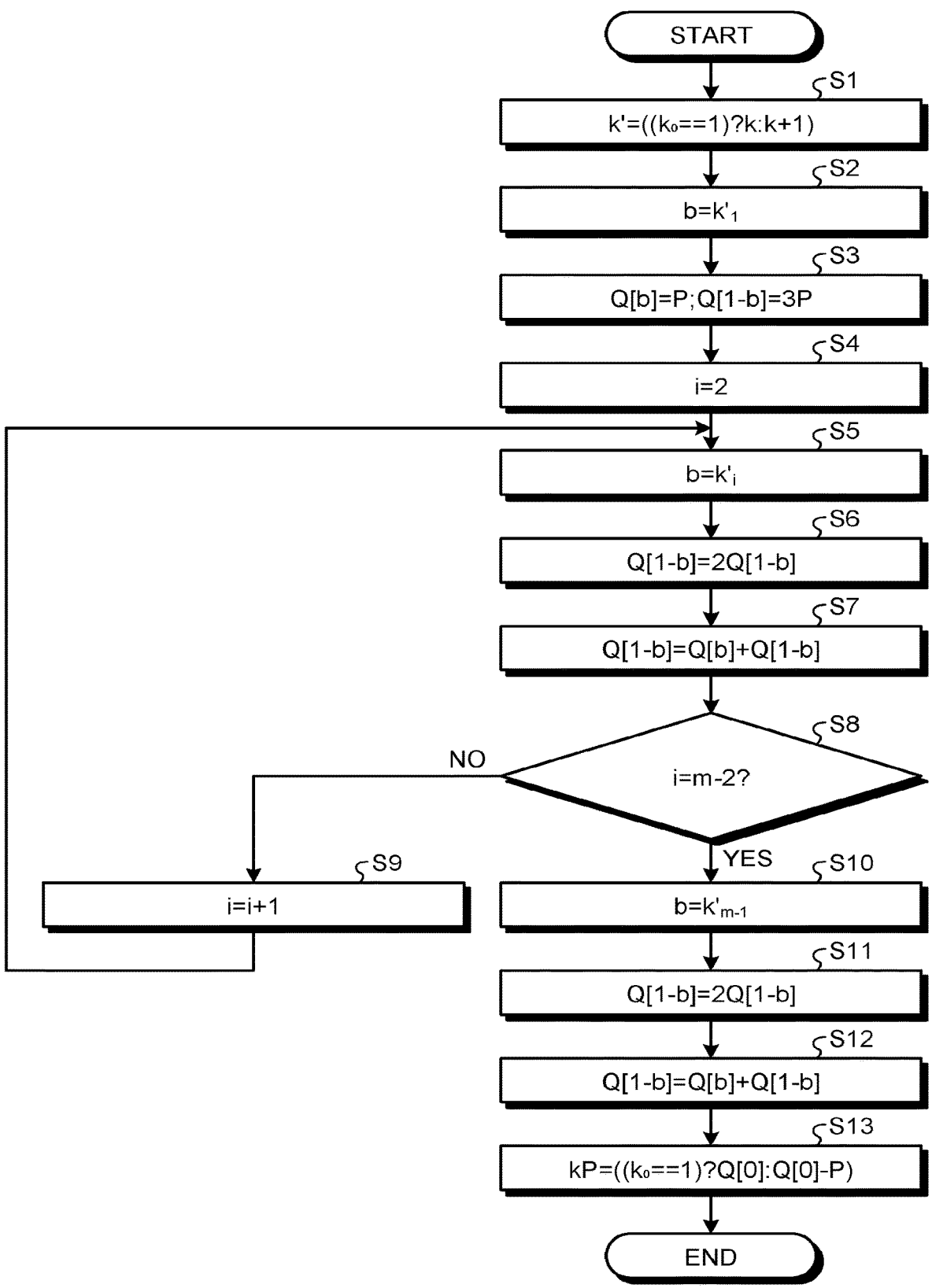
FIG. 3 is a flowchart illustrating a scalar multiplication processing procedure according to the embodiment.

Subsequently, the procedure of the scalar multiplication processing will be described with reference to FIG. 3. FIG. 3 is a flowchart illustrating a scalar multiplication processing procedure according to the embodiment. As a premise, the acquisition module 321 of the scalar multiplication unit 32 acquires the multiplication value k represented by the bit string of m bits from the signature processing unit 31, and further acquires the coordinate value P of the specific point from the signature processing unit 31.

The conversion module 322 of the scalar multiplication unit 32 first refers to the least significant bit $k_0$ of the multiplication value k, and when the least significant bit $k_0$ is 0, the multiplication value k is added by one to be the multiplication value k' (step S1). When the least significant bit $k_0$ of the multiplication value k is 1, the conversion module 322 of the scalar multiplication unit 32 sets the multiplication value k' to the multiplication value k. That is, when the least significant bit of the bit string of the multiplication value k is 0, the conversion module 322 of the scalar multiplication unit 32 converts the value of the least significant bit into 1. In this way, when a certain condition is satisfied, the conversion module 322 of the scalar multiplication unit 32 converts the value of the least significant bit of the bit string.

Subsequently, the setting module 323 of the scalar multiplication unit 32 inputs $k_1$, which is the second bit from the least significant bit of the bit string of the multiplication value k', to a variable b (step S2). Subsequently, the setting module 323 of the scalar multiplication unit 32 inputs the coordinate value P to a variable Q[b]. The setting module 323 of the scalar multiplication unit 32 inputs a value obtained by multiplying the coordinate value P by three to a variable Q[1−b] (step S3). In this way, the setting module 323 of the scalar multiplication unit 32 sets a value based on the coordinate value P for the variable Q[b] and the variable Q[1−b] based on the second bit value from the least significant bit of the bit string.

Subsequently, the loop processing module 324 of the scalar multiplication unit 32 inputs 2 to a variable i (step S4). Subsequently, the loop processing module 324 of the scalar multiplication unit 32 inputs a value of an i-th bit of the multiplication value k' to a variable b (step S5). Subsequently, the loop processing module 324 of the scalar multiplication unit 32 inputs a value obtained multiplying the variable Q[1−b] by two to the variable Q[1−b] (step S6). The loop processing module 324 of the scalar multiplication unit 32 inputs, to the variable Q[1−b], a value obtained by adding the variable Q[b] and the variable Q[1−b] (step S7).

Subsequently, the loop processing module 324 of the scalar multiplication unit 32 determines whether or not the variable i is m−2 (step S8), and when the variable i is m−2 (step S8: Yes), the processing in step S10 is performed. On the other hand, when the variable i is not m−2 (step S8: No), the loop processing module 324 of the scalar multiplication unit 32 increments the variable i (step S9), and performs the processing in steps S5 to S7.

In this way, the loop processing module 324 of the scalar multiplication unit 32 performs the loop processing (m−3) times for the processing of multiplying the variable Q[1−b] by two and the processing of adding the variable Q[1−b] and the variable Q[b].

In step S10, the scalar multiplication output module 325 of the scalar multiplication unit 32 inputs a value of an m-lth bit, which is the most significant bit of the multiplication value k', to the variable b. Subsequently, the scalar multiplication output module 325 of the scalar multiplication unit 32 inputs a value obtained by multiplying the variable Q[1−b] by two to the variable Q[1−b] (step S11). The scalar multiplication output module 325 of the scalar multiplication unit 32 inputs, to the variable Q[1−b], a value obtained by adding the variable Q[b] and the variable Q[1−b] (step S12). In this way, the scalar multiplication output module 325 of the scalar multiplication unit 32 performs processing for the most significant bit of the bit string. The scalar multiplication output module 325 of the scalar multiplication unit 32 performs the processing of multiplying the variable Q[1−b] by two and the processing of adding the variable Q[1−b] and the variable Q[b] as the processing for the most significant bit.

Subsequently, when the least significant bit $k_0$ of the multiplication value k is 1, the scalar multiplication output module 325 of the scalar multiplication unit 32 outputs the variable Q[0] as the coordinate value kP to the signature processing unit 31. When the least significant bit $k_0$ of the multiplication value k is 0, the scalar multiplication output module 325 of the scalar multiplication unit 32 outputs a variable Q[0]−P as the coordinate value kP to the signature processing unit 31. In this way, the scalar multiplication output module 325 of the scalar multiplication unit 32 outputs the coordinate value kP based on the processing for bits from the least significant bit to the most significant bit (step S13).

Subsequently, an example of outputting the coordinate value kP when the multiplication value k is 12 will be described with reference to FIGS. 3 and 4. FIG. 4 is a diagram illustrating changes in a variable Q[0] and a variable Q[1] when a multiplication value k is 12.

First, in step S1 of FIG. 3, since the least significant bit of the multiplication value k is 0, the conversion module 322 of the scalar multiplication unit 32 converts the least significant bit into 1. That is, the conversion module 322 sets the least significant bit of the multiplication value k' to 1.

Since a bit value of $k'_1$, which is the second bit value from the least significant bit of the bit string of the multiplication value k', is 0, in step S3 of FIG. 3, the setting module 323 of the scalar multiplication unit 32 inputs P to the variable Q[0], and 3P to the variable Q[1]. At this point, as illustrated in FIG. 4, the variable Q[0] becomes P and the variable Q[1] becomes 3P.

Subsequently, in step S6 of FIG. 3, since the second bit (the third bit from the least significant bit) of the multiplication value k' is 1, the loop processing module 324 of the scalar multiplication unit 32 inputs a value obtained by multiplying the variable Q[0] by two to the variable Q[0]. That is, the loop processing module 324 of the scalar multiplication unit 32 inputs 2P to the variable Q[0].

In step S7 of FIG. 3, the loop processing module 324 of the scalar multiplication unit 32 inputs, to the variable Q[0], a value obtained by adding the variable Q[0] and the variable Q[1]. That is, the loop processing module 324 of the scalar multiplication unit 32 inputs, to Q[0], 5P obtained by adding 2P and 3P. At this point, as illustrated in FIG. 4, the variable Q[0] becomes 5P and the variable Q[1] becomes 3P.

In step S8 of FIG. 3, since the variable i is 2 and m−2 is also 2, the loop processing module 324 of the scalar multiplication unit 32 finishes the loop processing at one time.

Subsequently, in step S11 of FIG. 3, since the most significant bit of the multiplication value k' is 1, the scalar multiplication output module 325 of the scalar multiplication unit 32 inputs, to the variable Q[0], a value obtained by multiplying the variable Q[0] by two. That is, the scalar multiplication output module 325 of the scalar multiplication unit 32 inputs 10P to the variable Q[0].

Subsequently, in step S12 of FIG. 3, the scalar multiplication output module 325 of the scalar multiplication unit 32 inputs, to the variable Q[0], a value obtained by adding the variable Q[0] and the variable Q[1]. That is, the scalar multiplication output module 325 of the scalar multiplication unit 32 inputs, to Q[0], 13P obtained by adding 10P and 3P.

Subsequently, in step S13 of FIG. 3, since the least significant bit of the multiplication value k is 0, the scalar multiplication output module 325 of the scalar multiplication unit 32 outputs 12P, which is Q[0]−P, as the coordinate value kP.

(Explanation of Signature Generation Processing)

Subsequently, the procedure of the signature generation processing will be described with reference to FIG. 5. FIG. 5 is a flowchart illustrating a signature generation processing procedure according to the embodiment.

First, the signature processing unit 31 reads a message from the storage unit 30 (step S21). The message is a signature processing target, for example, a computer program code.

Subsequently, the signature processing unit 31 uses a hash function to generate a message digest, which is a hash value of the message (step S22). The hash function is a function that takes a message as input, compresses the message into data having a certain bit length, and outputs the data as a hash value.

Subsequently, the signature processing unit 31 reads the secret key, the coefficient of the elliptic curve, and the coordinate value P which is a specific point on the elliptic curve from the storage unit 30 (step S23). Subsequently, the signature processing unit 31 generates a multiplication value k which is a random number, and inputs the multiplication value k and the coordinate value P to the scalar multiplication unit 32. Then, the signature processing unit 31 acquires the coordinate value kP from the scalar multiplication unit 32, and applies a known technique using the hash value, the secret key, the multiplication value k, and the coordinate value kP to generate signature data (step S24). The signature processing unit 31 may generate signature data by further using the order or coefficient of the coordinate value P. Subsequently, the signature processing unit 31 outputs the signature data to the storage unit 30.

(Explanation of Signature Verification)

Figures 6, 7:
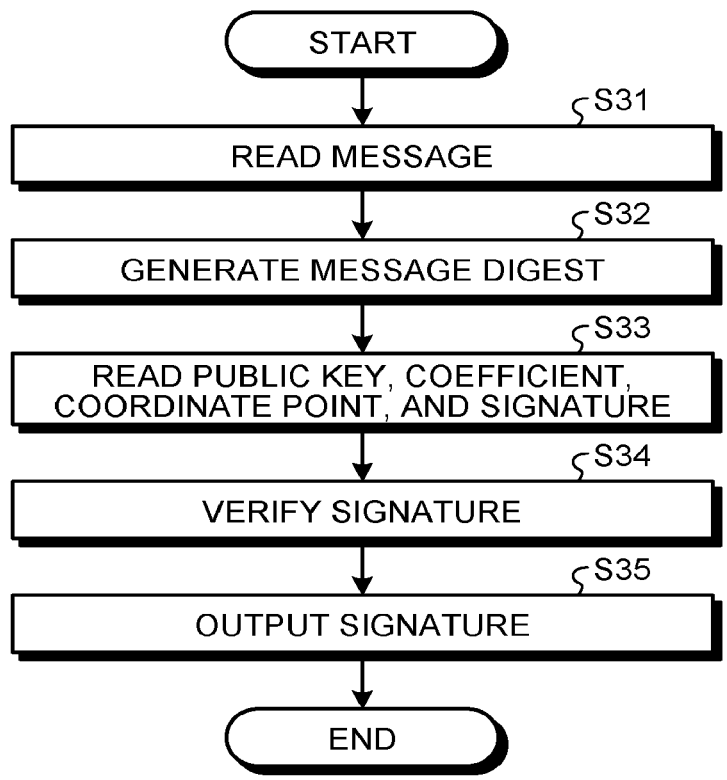
FIG. 6 is a flowchart illustrating a signature verification processing procedure according to the embodiment.
FIG. 7 is a diagram illustrating an algorithm of a comparative example.

Subsequently, the procedure of the signature verification will be described with reference to FIG. 6. FIG. 6 is a flowchart illustrating a signature verification processing procedure according to the embodiment.

First, the signature processing unit 31 reads a message from the storage unit 30 (step S31).

Subsequently, the signature processing unit 31 uses a hash function to generate a message digest, which is a hash value of the message (step S32).

Subsequently, the signature processing unit 31 reads the signature data, the public key, the coefficient of the elliptic curve, and the coordinate value P which is a specific point on the elliptic curve from the storage unit 30 (step S33).

Subsequently, the signature processing unit 31 verifies the signature. Specifically, the signature processing unit 31 inputs the multiplication value k, which is a value calculated based on the signature data and the hash value, and the coordinate value P to the scalar multiplication unit 32, and performs the signature verification by applying the known technique based on the coordinate value kP output by the scalar multiplication unit 32 (step S34). The signature processing unit 31 outputs a result indicating whether or not the signatures match (step S35).

In the above-described embodiment, the acquisition module 321 acquires the coordinate value P and the multiplication value k. The conversion module 322 converts a bit string of the multiplication value k. The setting module 323 sets a value based on the coordinate value P for the variable Q[1−b] and the variable Q[b] based on the second bit from the least significant bit of the bit string of the multiplication value k'. The loop processing module 324 performs the loop processing (m−3) times for the multiplication processing of the variable Q[1−b] and the addition processing of adding two different points which are not infinite points by adding the variable Q[1−b] and the variable Q[b]. The scalar multiplication output module 325 of the scalar multiplication unit 32 performs the processing of multiplying the variable Q[1−b] by two and the processing of adding the variable Q[1−b] and the variable Q[b] as the processing for the most significant bit, and outputs the coordinate value kP. In this way, since the processing of determining whether or not to be infinite points by adding two different points, which are not infinite points, is not included in the addition processing in the loop processing, the memory system 1 can perform the scalar multiplication processing more safely.

As a technique to be compared with this technique, there is a technique which is referred to as a double-add method (referred to as a comparative example). This comparative example will be described with reference to FIGS. 7 and 8. FIG. 7 is a diagram illustrating an algorithm of a comparative example.

As a premise of the algorithm illustrated in FIG. 7, the multiplication value k represented by a bit string of m bits and the coordinate value P are input. In Processing 1, the infinite point is input to Q[0], and the coordinate value P is input to Q[1]. In Processing 2, the loop processing is performed until the variable i of which an initial value is 0 becomes m−1. In Processing 2-1, $k_1$ is input to the variable b. In Processing 2-2, 2Q[1−b] is input to the variable Q[1−b]. In Processing 2-3, a value obtained by adding the variable Q[b] and the variable Q[l−b] is input to the variable Q[1−b]. In Processing 3, the variable Q[0] is input to the coordinate value kP.

Figure 8:
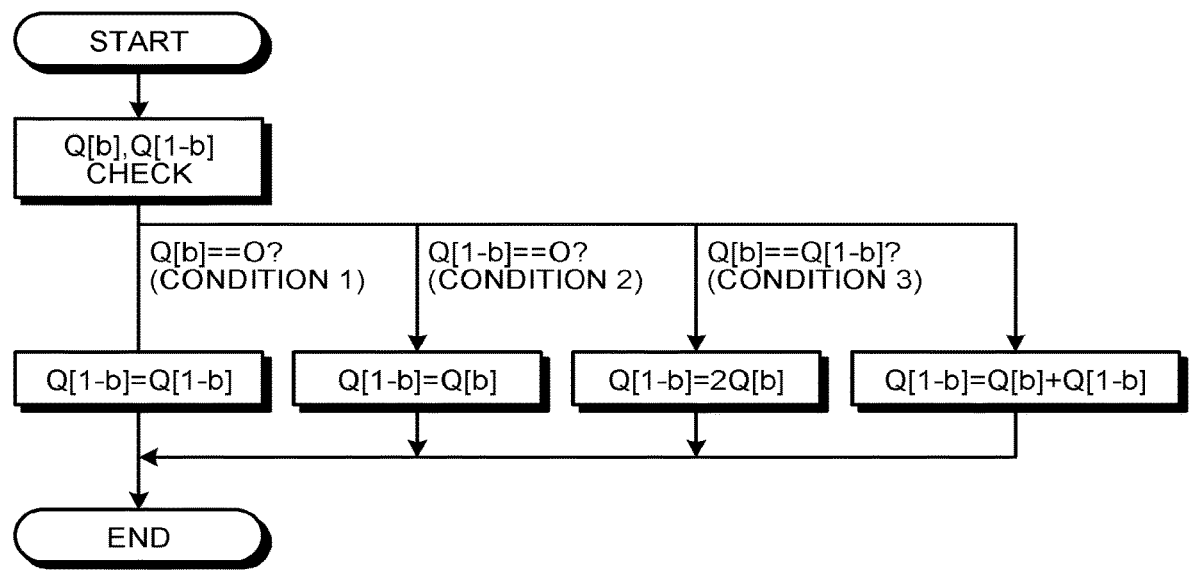
FIG. 8 is a diagram illustrating branching processing in addition processing.

In the addition processing of Processing 2-3 in the algorithm illustrated in FIG. 7, branching processing actually exists. FIG. 8 illustrates an example of the branching processing in the addition processing. FIG. 8 is a diagram illustrating branching processing in addition processing. As illustrated in FIG. 8, the variable Q[b] and the variable Q[1−b] are checked.

When the variable Q[b] is the infinite point (Condition 1), the variable Q[1−b] is input to the variable Q[1−b]. When the variable Q[1−b] is the infinite point (Condition 2), the variable Q[b] is input to the variable Q[1−b]. When the variable Q[b] and the variable Q[1−b] are equal to each other (Condition 3), a value obtained by multiplying the variable Q[b] by two is input to the variable Q[1−b]. When none of Conditions 1 to 3 is satisfied, a value obtained by adding the variable Q[1−b] and the variable Q[b] is input to the variable Q[1−b].

As described above, in the comparative example, since the infinite point is input in Processing 1 of the algorithm illustrated in FIG. 7, it is required to determine whether or not the variable Q[1−b] and the variable Q[b] are infinite points as described in FIG. 8 in the addition processing of Processing 2-3. On the other hand, in the memory system 1 of the above-described embodiment, a value based on the coordinate value P is set for the variable Q[b] and the variable Q[1−b] to perform the addition processing, and in the addition processing at the time of the loop processing, the processing can be performed without determining whether or not to be the infinite point.

Modification Example

In the above description, a case in which the conversion module 322 of the scalar multiplication unit 32 converts only the least significant bit of the bit string of the multiplication value k is described. The conversion module 322 of the scalar multiplication unit 32 in the modification example further performs conversion processing based on the most significant bit, and performs the scalar multiplication processing based on a result of the conversion processing.

Figure 9:
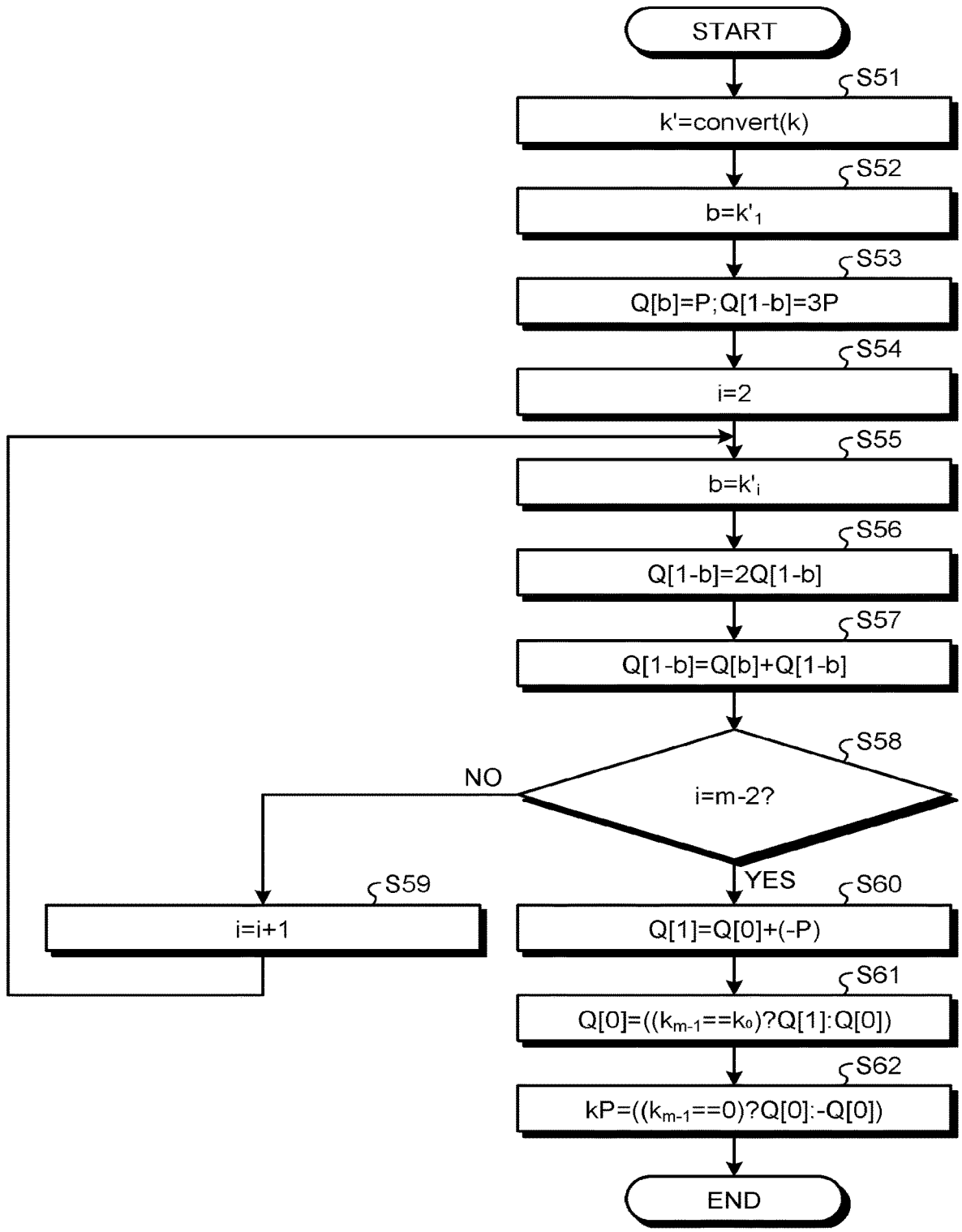
FIG. 9 is a flowchart illustrating a scalar multiplication processing procedure according to a modification example.

FIG. 9 is a flowchart illustrating a scalar multiplication processing procedure according to a modification example. As a premise, the acquisition module 321 of the scalar multiplication unit 32 acquires the multiplication value k represented by the bit string of m bits, and further acquires the coordinate value P of the specific point.

First, in step S51, the conversion module 322 of the scalar multiplication unit 32 performs conversion into a multiplication value k' based on the content of the multiplication value k.

Figure 10:
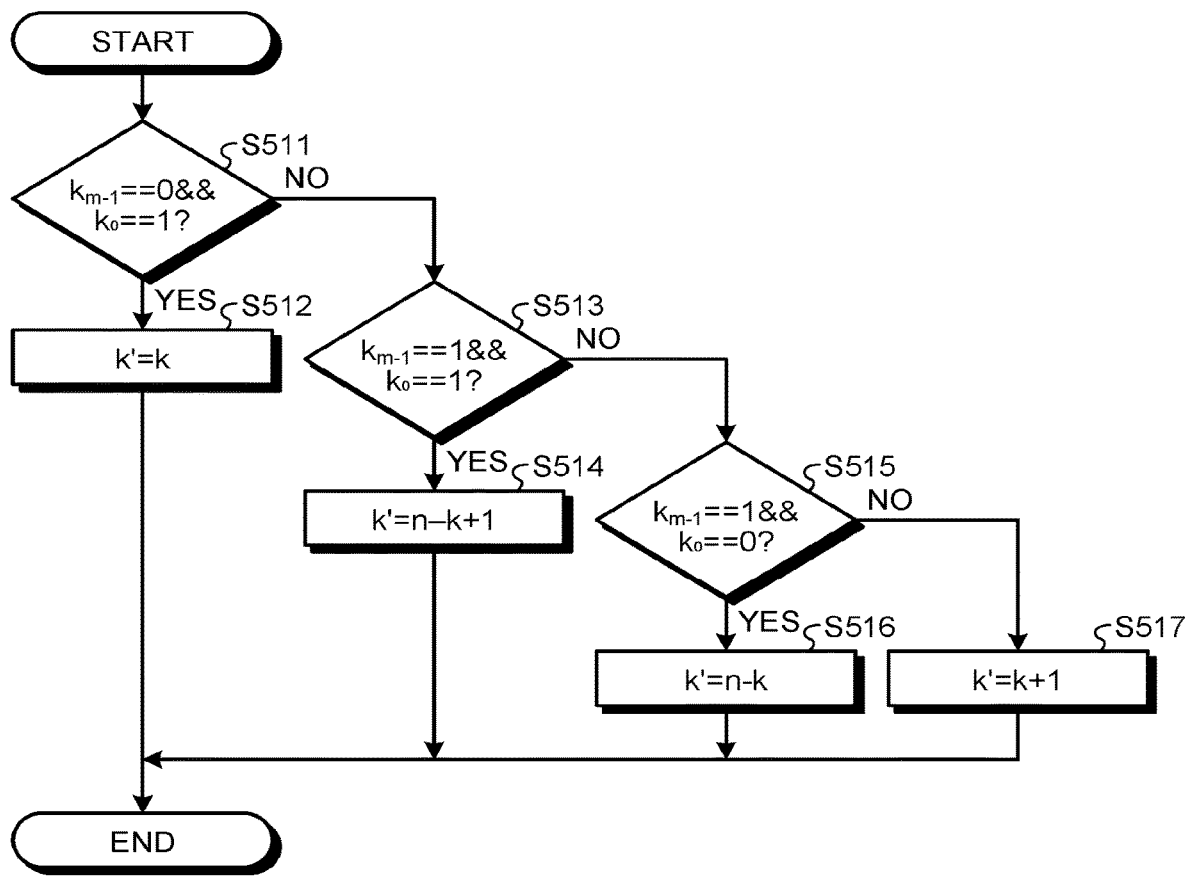
FIG. 10 is a flowchart illustrating a processing procedure of conversion processing based on a most significant bit and a least significant bit.

Here, the detailed processing content of step 351 will be described with reference to FIG. 10. FIG. 10 is a flowchart illustrating a processing procedure of conversion processing based on a most significant bit and a least significant bit.

In step S511, when the most significant bit of the multiplication value k is 0 and the least significant bit is 1 (step S511: Yes), the conversion module 322 inputs the multiplication value k to the multiplication value k' (step 3512), and ends the processing. When the condition of step S511 is not satisfied (step S511: No), the conversion module 322 performs the processing of step S513.

In step S513, when the most significant bit of the multiplication value k is 1 and the least significant bit is 1, the conversion module 322 inputs "n−k+1" (n is odd prime number) to the multiplication value k' (step S514), and ends the processing. When the condition of step S513 is not satisfied (step S513: No), the conversion module 322 performs the processing of step S515.

In step S515, when the most significant bit of the multiplication value k is 1 and the least significant bit is 0, the conversion module 322 inputs "n−k" to the multiplication value k' (step S516), and ends the processing. When the condition of step 3515 is not satisfied (step S515: No), the conversion module 322 inputs "k+1" to the multiplication value k' (step S517), and ends the processing.

Returning to FIG. 9, steps S52 to S59 are respectively common to steps S2 to S9 in the flowchart of FIG. 3, and thus the description thereof will be omitted. In step S60, the scalar multiplication output module 325 inputs a result of the variable Q[0]+(−P) to the variable Q[1]. Subsequently, when the most significant bit and the least significant bit of the multiplication value k are equal to each other, the scalar multiplication output module 325 inputs the variable Q[1] to the variable Q[0](step S61). Subsequently, the scalar multiplication output module 325 outputs a value of the variable Q[0] as the coordinate value kP when the most significant bit of the multiplication value k is 0, and outputs n-variable Q[0] (−Q[0]) as the coordinate value kP when the most significant bit of the multiplication value k is not 0 (step S62).

Subsequently, an example of outputting the coordinate value kP when the multiplication value k is 9 will be described with reference to FIGS. 9, 10, and 11. FIGS. 11A to 11D are diagrams illustrating changes in a variable Q[0]

and a variable Q[1] when a multiplication value k is 9. Here, n, which is an odd prime number, is 13.

First, in step S513 of FIG. 10, since the most significant bit and the least significant bit of the multiplication value k is 1, the conversion module 322 of the scalar multiplication unit 32 inputs "n−k+1" to the multiplication value k'.

Since the second bit value from the least significant bit of the bit string of the multiplication value k' is 0, in step S53 of FIG. 9, the setting module 323 of the scalar multiplication unit 32 inputs P to the variable Q[0], and 3P to the variable Q[1].

Subsequently, in step S56 of FIG. 9, since the second bit (the third bit from the least significant bit) of the multiplication value k' is 1, the loop processing module 324 of the scalar multiplication unit 32 inputs a value obtained by multiplying the variable Q[0] by two to the variable Q[0]. That is, the loop processing module 324 of the scalar multiplication unit 32 inputs 2P to the variable Q[0].

In step S57 of FIG. 9, the loop processing module 324 of the scalar multiplication unit 32 inputs, to the variable Q[0], a value obtained by adding the variable Q[0] and the variable Q[1]. That is, the loop processing module 324 of the scalar multiplication unit 32 inputs, to Q[0], 5P obtained by adding 2P and 3P.

In step S58 of FIG. 9, since the variable i is 2 and m−2 is also 2, the loop processing module 324 of the scalar multiplication unit 32 finishes the loop processing at one time.

In step S60 of FIG. 9, the scalar multiplication output module 325 inputs 4P, which is a result obtained by calculating the variable Q[0]+(−P), to the variable Q[1]. In step S61 of FIG. 9, since the most significant bit of the multiplication value k and the least significant bit of the multiplication value k before the conversion are equal to each other, the scalar multiplication output module 325 inputs 4P, which is the variable Q[1], to the variable Q[0]. In step S62 of FIG. 9, since the most significant bit of the multiplication value k before the conversion is 1, the scalar multiplication output module 325 outputs 9P, which is n-variable Q[0], as the coordinate value kP.

In this way, according to the modification example, in the memory system 1, since the most significant bit of the multiplication value k is converted to be 0, the processing of multiplying the variable Q[1−b] by two after the loop processing can be at least omitted, and the scalar multiplication processing can be easily performed compared to a case in which the conversion is performed based on only the least significant bit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A signature processing device comprising:
a memory; and
a controller coupled to the memory, the controller being configured to:
generate, by using a hash function, a first hash value of a first message read from the memory;
convert a bit string of m bits (where m is an integer of 4 or more) representing a first multiplication value k when a certain condition is satisfied;
set a value based on a coordinate value P of a specific point for a first variable and a second variable based on a second bit value from a least significant bit of the bit string;
perform loop processing (m−3) times for multiplication processing of performing multiplication on the first variable and addition processing of adding two different points which are not infinite points by adding the first variable and the second variable;
obtain a first coordinate value kP by a scalar multiplication of the coordinate value P with the first multiplication value k based on processing for a most significant bit of the bit string;
generate and output the signature data for the first message based on the first hash value, the first coordinate value kP, and a secret key read from the memory; and
perform signature verification based on the signature data.

2. The signature processing device according to claim 1, wherein the controller is further configured to perform the multiplication processing of performing multiplication on the first variable, and the addition processing of adding the first variable and the second variable, based on the most significant bit of the bit string.

3. The signature processing device according to claim 1, wherein the controller is further configured to perform processing of converting the least significant bit into 1 when the least significant bit of the bit string is 0.

4. The signature processing device according to claim 1, wherein the controller is further configured to convert the bit string based on a condition for the most significant bit and the least significant bit of the bit string.

5. The signature processing device according to claim 4, wherein the controller is further configured to perform conversion processing in which the most significant bit of the bit string becomes 0 and the least significant bit of the bit string becomes 1.

6. The signature processing device according to claim 5, wherein
the controller is further configured not to perform conversion when the most significant bit of the bit string is 0 and the least significant bit is 1,
the controller is further configured to convert the multiplication value k into "n−k+1" (n is odd prime number) when the most significant bit of the bit string is 1 and the least significant bit is 1,
the controller is further configured to convert the multiplication value k into "n−k" when the most significant bit of the bit string is 1 and the least significant bit is 0, and
the controller is further configured to convert the multiplication value k into "k+1" when the most significant bit of the bit string is 0 and the least significant bit is 0.

7. The signature processing device according to claim 1, wherein the coordinate value P of the specific point is indicated by one of an affine coordinate, a homogeneous coordinate, and a Jacobian coordinate.

8. The signature processing device according to claim 1, wherein the controller is further configured to:
generate, by using the hash function, a second hash value of a second message read from the memory;
calculate a second multiplication value k based on the generated signature data and the second hash value;

obtain a second coordinate value kP based on the second multiplication value k and the coordinate value P by using the loop processing and the scalar multiplication; and perform signature verification for the second message by using the second coordinate value kP and a public key read from the memory.

9. The signature processing device according to claim 1, wherein the specific point is a specific point included in a specific elliptic curve.

10. The signature processing device according to claim 2, wherein after performing the multiplication processing and the addition processing based on the most significant bit of the bit string, the controller is further configured to perform correction processing based on the least significant bit and output the first coordinate value kP.

11. A method of controlling an arithmetic device, the method comprising:

generating, by using a hash function, a first hash value of a first message read from a memory in the arithmetic device;

acquiring a first multiplication value k and a coordinate value P of a specific point;

converting a bit string of m bits (where m is an integer of 4 or more) representing the first multiplication value k when a certain condition is satisfied;

setting a value based on the coordinate value P of the specific point for a first variable and a second variable based on a second bit value from a least significant bit of the bit string;

performing loop processing (m−3) times for multiplication processing of performing multiplication on the first variable and addition processing of adding two different points which are not infinite points by adding the first variable and the second variable;

obtaining a first a coordinate value kP by a scalar multiplication of the coordinate value P with the first multiplication value k based on processing for a most significant bit of the bit string;

generating and outputting the signature data for the first message based on the first hash value, the first coordinate value kP, and a secret key read from the memory; and performing signature verification based on the signature data.

12. The method according to claim 11, wherein the multiplication processing of performing multiplication on the first variable and the addition processing of adding the first variable and the second variable are performed based on the most significant bit of the bit string.

13. The method according to claim 11, further comprising performing processing of converting the least significant bit into 1 when the least significant bit of the bit string is 0.

14. The method according to claim 11, wherein the converting includes converting the bit string based on a condition for the most significant bit and the least significant bit of the bit string.

15. The method according to claim 11, further comprising performing conversion processing in which the most significant bit of the bit string becomes 0 and the least significant bit of the bit string becomes 1.

16. The method according to claim 15, wherein conversion is not performed when the most significant bit of the bit string is 0 and the least significant bit is 1, the multiplication value k is converted into "n−k+1" (n is odd prime number) when the most significant bit of the bit string is 1 and the least significant bit is 1, the multiplication value k is converted into "n−k" when the most significant bit of the bit string is 1 and the least significant bit is 0, and the multiplication value k is converted into "k+1" when the most significant bit of the bit string is 0 and the least significant bit is 0.

17. The method according to claim 11, wherein the coordinate value P of the specific point is indicated by one of an affine coordinate, a homogeneous coordinate, and a Jacobian coordinate.

18. The method according to claim 11, further comprising:

generating, by using the hash function, a second hash value of a second message read from the memory;

calculating a second multiplication value k based on the generated signature data and the second hash value;

obtaining a second coordinate value kP based on the second multiplication value k and the coordinate value P by using the loop processing and the scalar multiplication; and performing signature verification for the second message by using the second coordinate value kP.

19. The method according to claim 11, wherein the specific point is a specific point included in a specific elliptic curve.

20. The method according to claim 12, further comprising, after performing the multiplication processing and the addition processing based on the most significant bit of the bit string, performing correction processing based on the least significant bit and outputting the first coordinate value kP.

21. The signature processing device according to claim 1, wherein the first message read from the memory includes a computer program code.

22. The method according to claim 11, wherein the first message read from the memory includes a computer program code.

* * * * *